United States Patent
Schneider et al.

(10) Patent No.: US 10,831,735 B2
(45) Date of Patent: Nov. 10, 2020

(54) PROCESSING DEVICE CONFIGURED FOR EFFICIENT GENERATION OF A DIRECT MAPPED HASH TABLE PERSISTED TO NON-VOLATILE BLOCK MEMORY

(71) Applicant: EMC IP Holding Company LLC, Hopkinton, MA (US)

(72) Inventors: Zvi Schneider, Tel Aviv (IL); Maor Rahamim, Ramla (IL); Uri Shabi, Tel Mond (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 330 days.

(21) Appl. No.: 16/044,988

(22) Filed: Jul. 25, 2018

(65) Prior Publication Data

US 2020/0034440 A1 Jan. 30, 2020

(51) Int. Cl.
*G06F 17/00* (2019.01)
*G06F 7/00* (2006.01)
*G06F 16/22* (2019.01)

(52) U.S. Cl.
CPC .................. *G06F 16/2255* (2019.01)

(58) Field of Classification Search
CPC .................................................... G06F 16/2255
USPC ........................................................ 707/747
See application file for complete search history.

(56) References Cited

U.S. PATENT DOCUMENTS

| 5,542,089 A * | 7/1996 | Lindsay | G06F 16/2462 707/999.002 |
| 6,055,538 A * | 4/2000 | Kessenich | G06F 16/951 707/E17.108 |
| 6,578,131 B1 * | 6/2003 | Larson | G06F 16/9014 711/216 |
| 7,287,131 B1 * | 10/2007 | Martin | G06F 16/9014 711/154 |

(Continued)

FOREIGN PATENT DOCUMENTS

WO   2016111954 A1   7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Pavan Mamillapalli
(74) *Attorney, Agent, or Firm* — Ryan, Mason & Lewis, LLP

(57) ABSTRACT

An apparatus in one embodiment comprises at least one processing device. The processing device is configured to generate a hash entry of a hash table implementing a key-value store that comprises a plurality of buckets associated with corresponding keys where a given bucket comprises a bucket index having two or more entries for storage of values that hash to a key associated with the given bucket. The processing device is also configured to allocate blocks in non-volatile memory, to split the given bucket into chunks each comprising at least one entry of the bucket index, and (Continued)

to persist the hash table to the non-volatile memory utilizing a direct mapping of the chunks of the given bucket to respective designated block offset positions in the allocated blocks. Persisting the hash table comprises storing first and second chunks of the given bucket in first and second allocated blocks.

20 Claims, 7 Drawing Sheets

(56) References Cited

U.S. PATENT DOCUMENTS

| | | | |
|---|---|---|---|
| 7,444,464 | B2 | 10/2008 | Urmston et al. |
| 7,464,103 | B2 * | 12/2008 | Siu .......................... G06F 21/10 |
| | | | 707/999.002 |
| 8,095,726 | B1 | 1/2012 | O'Connell et al. |
| 8,214,612 | B1 | 7/2012 | Natanzon |
| 8,539,199 | B2 * | 9/2013 | Burroughs ............ G06F 15/167 |
| | | | 711/216 |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,606,870 | B1 | 3/2017 | Meiri et al. |
| 9,716,754 | B2 | 7/2017 | Swift |
| 9,824,092 | B2 * | 11/2017 | Shamis ................ G06F 16/211 |
| 10,185,730 | B2 * | 1/2019 | Bestler ................ G06F 12/1408 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2011/0225391 | A1 * | 9/2011 | Burroughs ............ G06F 9/3885 |
| | | | 711/216 |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0188591 | A1 * | 6/2016 | Bestler .................... G06F 3/067 |
| | | | 707/744 |
| 2016/0202927 | A1 | 7/2016 | Klarakis et al. |
| 2016/0224259 | A1 | 8/2016 | Ahrens et al. |
| 2016/0335163 | A1 * | 11/2016 | Teodorescu ............. H04L 69/16 |
| 2017/0192857 | A1 | 7/2017 | Meiri et al. |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Jessica Su, "Direct-Address Tables," CS 161 Lecture 9—Hashing, Aug. 2016, 10 pages.

* cited by examiner

PROCESSING DEVICE CONFIGURED FOR EFFICIENT GENERATION OF A DIRECT MAPPED HASH TABLE PERSISTED TO NON-VOLATILE BLOCK MEMORY

FIELD

The field relates generally to information processing systems, and more particularly to storage in information processing systems.

BACKGROUND

In many information processing systems, it is desirable to persist data structures from volatile to non-volatile memory or storage. Such functionality enables recovery from power cycles and other events that may affect the volatile memory. One such data structure is a direct-address table, which may be implemented as a direct mapped hash table. A hash table is a data structure that implements an associative array abstract data type, or a structure that maps keys to values. The hash table uses a hash function to compute from a given key an index where a corresponding value is stored. To handle hash collisions, or when the hash function generates a same index for more than one key, the hash table may chain entries in a list. Conventional approaches for persisting data structures from volatile to non-volatile memory, however, can be problematic. For example, in some storage systems, use of certain data structures for persisting from volatile to non-volatile memory waste substantial computational and memory or storage resources. These and other related inefficiencies can significantly undermine system performance.

SUMMARY

Illustrative embodiments provide techniques for generating a direct mapped hash table that is persisted to a non-volatile block memory, and for allocating values in the direct mapped hash table. Such arrangements can considerably reduce the amounts of storage system computational and memory resources that are required for persisting data structures from volatile to non-volatile memory through optimized amortization and increased space efficiency in the direct mapped hash table, thereby leading to improved storage system performance.

In one embodiment, an apparatus comprises at least one processing device comprising a hardware processor. The processing device is configured to generate a hash table implementing a key-value store, the hash table comprising a plurality of buckets each associated with a corresponding one of a plurality of keys, a given bucket comprising a given bucket index having two or more entries for storage of values that hash to a given key associated with the given bucket. The processing device is also configured to allocate, in a non-volatile memory, two or more blocks for persisting the hash table to the non-volatile memory, to split the given bucket into two or more chunks, each chunk comprising at least one of the two or more entries of the given bucket index, and to persist the hash table to the non-volatile memory utilizing a direct mapping of the two or more chunks of the given bucket to respective designated block offset positions in the allocated blocks of the non-volatile memory. Persisting the hash table to the non-volatile memory comprises storing a first one of the two or more chunks of the given bucket in a first one of the allocated blocks and storing at least a second one of the two or more chunks of the given bucket in at least a second one of the allocated blocks.

The processing device in some embodiments is implemented in a host device configured to communicate over a network with at least one storage system that utilizes a direct mapped hash table for persisting data structures from volatile memory to non-volatile storage. In other embodiments, the processing device is implemented in at least one storage system that utilizes the direct mapped hash table for persisting data structures from volatile memory to non-volatile storage. These are only examples, and alternative implementations are possible.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
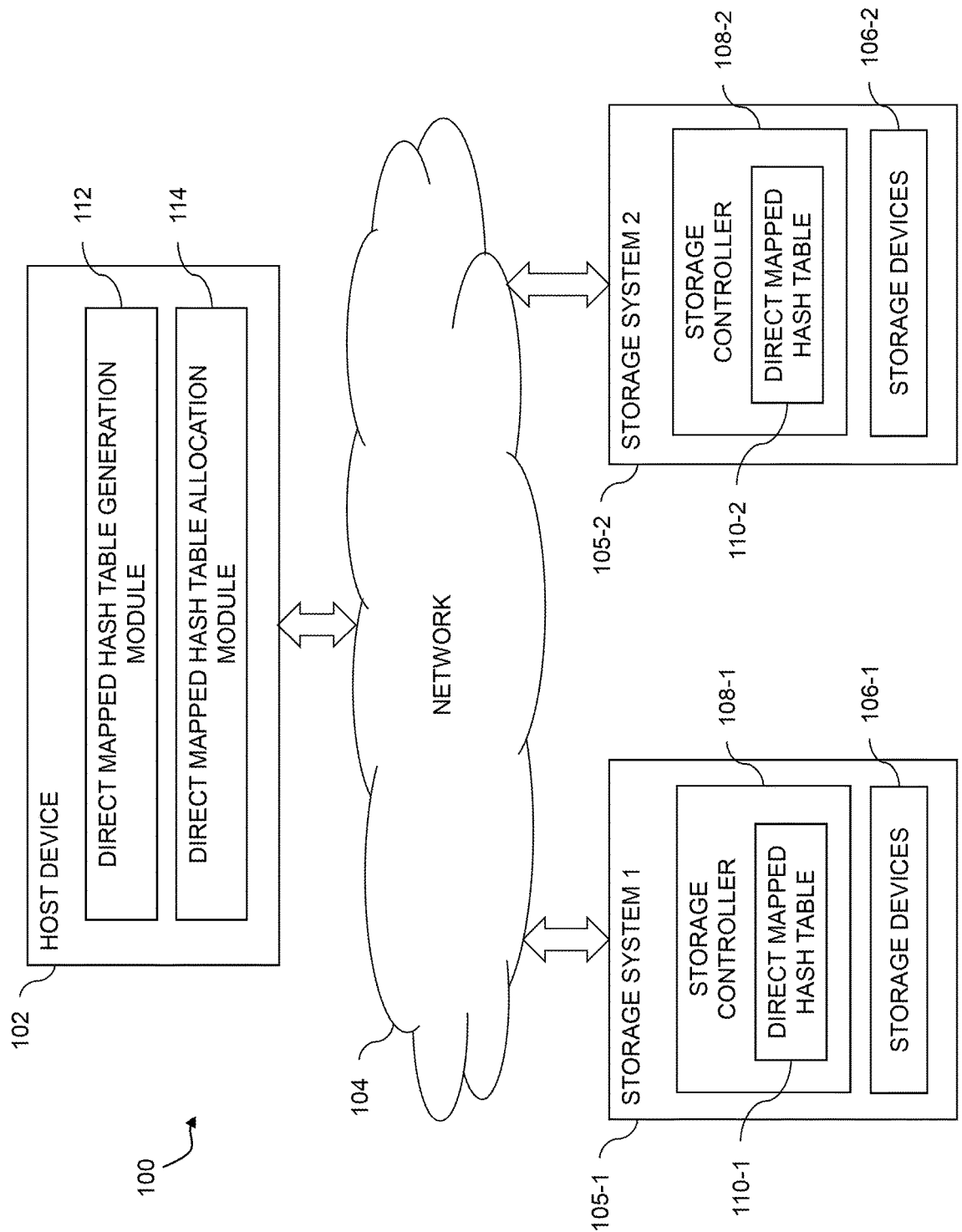
FIG. 1 is a block diagram of an information processing system comprising a host device configured with functionality for generating a direct mapped hash table and allocating values in the direct mapped hash table in an illustrative embodiment.

FIG. 1 shows an information processing system 100 configured in accordance with an illustrative embodiment. The information processing system 100 comprises a host device 102, which may comprise one of a plurality of host devices of a computer system. The host device 102 communicates over a network 104 with first and second storage systems 105-1 and 105-2, also denoted as Storage System 1 and Storage System 2, respectively. The storage systems 105-1 and 105-2 are collectively referred to herein as storage systems 105. The host device 102 and storage systems 105 may be part of an enterprise computing and storage system, a cloud-based system or another type of system.

The host device 102 and storage systems 105 illustratively comprise respective processing devices of one or more processing platforms. For example, the host device 102 and the storage systems 105 can each comprise one or more processing devices each having a processor and a memory, possibly implementing virtual machines and/or containers, although numerous other configurations are possible.

The host device 102 and the storage systems 105 can additionally or alternatively be part of cloud infrastructure such as an Amazon Web Services (AWS) system. Other examples of cloud-based systems that can be used to provide one or more of host device 102 and storage systems 105 include Google Cloud Platform (GCP) and Microsoft Azure.

The host device 102 is configured to write data to and read data from the storage systems 105. The host device 102 and the storage systems 105 may be implemented on a common processing platform, or on separate processing platforms. A wide variety of other types of host devices can be used in other embodiments.

The host device 102 in some embodiments illustratively provides compute services such as execution of one or more applications on behalf of each of one or more users associated with the host device 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage systems 105 are accessible to the host device over the network 104. The storage system 105-1 comprises a plurality of storage devices 106-1 and an associated storage controller 108-1. Similarly, the storage system 105-2 comprises a plurality of storage devices 106-2 and an associated storage controller 108-2. The storage devices 106-1 and 106-2 are collectively referred to herein as storage devices 106. The storage controllers 108-1 and 108-2 are collectively referred to as storage controllers 108.

The storage controllers 108-1 and 108-2 include respective direct mapped hash tables 110-1 and 110-2, collectively direct mapped hash tables 110. Although shown in FIG. 1 as being implemented in the storage controllers 108, in other embodiments the direct mapped hash tables 110 may be implemented at least partially outside the storage controllers 108, such as in storage devices 106, host device 102 or in another device not explicitly shown in FIG. 1.

The direct mapped hash tables 110 are assumed to provide a data structure for persisting data from volatile to non-volatile memory (e.g., such as that provided by storage devices 106). The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, at least one of the storage systems 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement one or both of storage systems 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The host device 102 in the FIG. 1 embodiment includes direct mapped hash table generation module 112 and direct mapped hash table allocation module 114, which collectively provide functionality for generating or constructing the direct mapped hash tables 110 and allocating values in the direct mapped hash tables 110 in a manner that provides optimized amortization and space efficiency as described in further detail below. The host device 102 should also be understood to include additional modules and other components typically found in conventional implementations of computers, servers or other host devices, although such additional modules and other components are omitted from the figure for clarity and simplicity of illustration.

As mentioned above, a hash table is a data structure that implements an associative array abstract data type, a structure that can map keys to values. The hash table uses a hash function to compute from a given key an index into an array of buckets from which a desired value can be found. Each bucket thus corresponds to one key (e.g., each key maps to one bucket), where the bucket includes all values mapping to its corresponding key. The hash function used for the hash table should provide a uniform distribution of hash values over the table size. Hash collisions refer to instances in which the hash function generates a same index for more than one key. Hash collisions may be resolved by chaining entries within the same bucket index in a list.

Hardening or persisting a hash table in a direct mapping method means that there is a one-to-one mapping between persistent and volatile entry positions. In other words, in the volatile copy of the hash table data structure each entry directly maps to the non-volatile copy. For example, an entry in bucket A at position B in the volatile copy maps directly in the non-volatile copy to block X offset Y. As a consequence of this one-to-one mapping, when an entry in the hash table is removed, its location in the bucket is marked as invalid in both the volatile and non-volatile or persistent copies of the hash table. The bucket length is not reduced by defragging (e.g., by removing invalid entries that create "holes" in the hash table), since this requires an extra update of the persistent copy of the hash table. As a general matter, it is desired to reduce the number of updates of the persistent copy of the hash table, as they are considered "expensive" in terms of the time and resources required for such writes. The amortization level of the hash table is the amount of "dirty" entries in the hash table which are updated within a single persistent write operation. The term "dirty" in this context refers to volatile entries which differ from the corresponding non-volatile entries.

In direct mapping methods, persistent blocks in the non-volatile storage are pre-allocated for the worst case maximal hash table size. Nevertheless, to reduce wasted blocks in use, it is desired to keep the actual blocks in use in proportion to the actual size of the hash table. Also, as the number of buckets in a hash table increases the number of dirty entries per bucket decreases, which effectively reduces amortization. Embodiments provide techniques for generating or constructing direct mapped hash tables 110 which keep the actual blocks in use in proportion to the actual size of the direct mapped hash table, while also optimizing amortization through smart allocation when filling entries of the direct mapped hash tables 110.

The direct mapped hash table generation module 112 optimizes the construction of the direct mapped hash tables 110 by implementing bucket splits. Buckets in the persistent, non-volatile memory are split into equally-sized chunks each containing a fixed number of consecutive entries (e.g., the split size). As a result, each bucket is fragmented into a number of chunks which is equal to the maximum bucket length divided by the split size (e.g., num-chunks=max-bucket-len/split-size). For example, with a split size of 2 and maximum bucket length of 12, the number of chunks is 6. Based on the bucket split, a block is constructed in the persistent copy of the hash table as a collection of chunks from different buckets. As the non-volatile copy is block based, the number of chunks that can fit in a single block is the block size divided by the chunk size (e.g., block-size/chunk-size), where the chunk size is equal to the split size multiplied by the entry size (e.g., chunk-size=split-size*entry-size). In the above-described layout, the number of buckets in a block is a function of the block size and chunk size parameters only, and the maximal table size does not affect it.

Described below is an example construction of one or more of the direct mapped hash tables 110, although it should be appreciated that the particular values for various parameters are presented by way of example only and that various other values may be used in other embodiments. Consider a hash table with $2^{28}$ buckets (e.g., approximately one-quarter billion buckets), with a maximal bucket length of 64 entries. With a split size of 4, each bucket is thus fragmented into 16 equally-sized chunks. It is further assumed that each block can contain 32 chunks. Thus, the following layout for the direct mapped hash table 110 is provided:

---

Block ID 0 = [bucket-0-chunk-0, bucket-1-chunk-0, . . . ,bucket-31-chunk-0]
Block ID 1 = [bucket-32-chunk-0, bucket-33-chunk-0, . . . , bucket-63-chunk-0]
. . .
Block ID 8388608 (=$2^{28}$/32) = [bucket-0-chunk-1, bucket-1-chunk-0, . . . , bucket-31-chunk-1]
Block ID 8388609 = [bucket-32-chunk-1, bucket-33-chunk-1, . . . , bucket-63-chunk-1]
. . .

---

With this construction, the direct mapped hash table generation module 112 overcomes disadvantages associated with conventional direct mapped hash tables. For example, as long as the buckets do not reach their maximal length, the direct mapped hash table 110 only writes blocks which contain actual chunks in use. Further as the number of buckets-in-block is increased by max-bucket-len/chunk-size, the amortization level is increased by a factor of up to max-bucket-len/chunk-size ratio.

Advantageously, the direct mapped hash table 110 constructed in the manner described above will reduce writes to only those blocks that contain actual chunks in use. For example, when the direct mapped hash table 110 is "small" (e.g., where there are relatively few entries filled for each bucket index), a correspondingly small number of allocated blocks are actually written to. For example, consider the example above where each bucket is split into 16 chunks, and assume that no bucket has more than two chunks thereof which contain entries having values written thereto. In this scenario, only ⅛ of the allocated blocks in the non-volatile memory need to be written to. Of course, different buckets may have different numbers of entries (or chunks) in use, but the amount of blocks written to is still bounded. The use of the allocated blocks will scale as the number of entries (or chunks) in use increases.

The direct mapped hash table allocation module 114 is configured for smart allocation of new values to entries in the direct mapped hash tables 110. Assuming a system state where a new value is to be added to a bucket that has multiple holes (e.g., entries or locations in a bucket marked as invalid when values are removed from the hash table), the new entry may be allocated to any of the holes. The direct mapped hash table allocation module 114, however, selects or favors holes over one another to maximize amortization. By choosing a hole that belongs to a page in the volatile memory that has other updates pending (e.g., a block with the maximum number of dirty entries), the number of writes to the non-volatile memory can be reduced. In some embodiments, the direct mapped hash table allocation module 114 utilizes a selection mechanism that prefers a hole mapped to a block with the maximum number of dirty entries. This selection mechanism is built upon the bucket split construction described above, which splits one bucket over multiple blocks in the persistent storage.

The host device 102 and storage systems 105 in the FIG. 1 embodiment are assumed to be implemented using at least one processing platform each comprising one or more processing devices each having a processor coupled to a memory. Such processing devices can illustratively include particular arrangements of compute, storage and network resources.

The host device 102 and the storage systems 105 may be implemented on respective distinct processing platforms, although numerous other arrangements are possible. For example, in some embodiments at least portions of the host device 102 and one or both of the storage systems 105 are implemented on the same processing platform. The storage systems 105 can therefore be implemented at least in part within at least one processing platform that implements at least a portion of the host device 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 102 and storage systems 105 to reside in different data centers. Numerous other distributed implementations of one or both of the host device 102 and the storage systems 105 are possible. Accordingly, the storage systems 105 can also be implemented in a distributed manner across multiple data centers.

Additional examples of processing platforms utilized to implement host devices and/or storage systems in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host device 102, network 104, storage systems 105, storage devices 106, storage controllers 108 and direct mapped hash tables 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing direct mapped hash table generation and allocation functionality will be described below.

Figure 2:
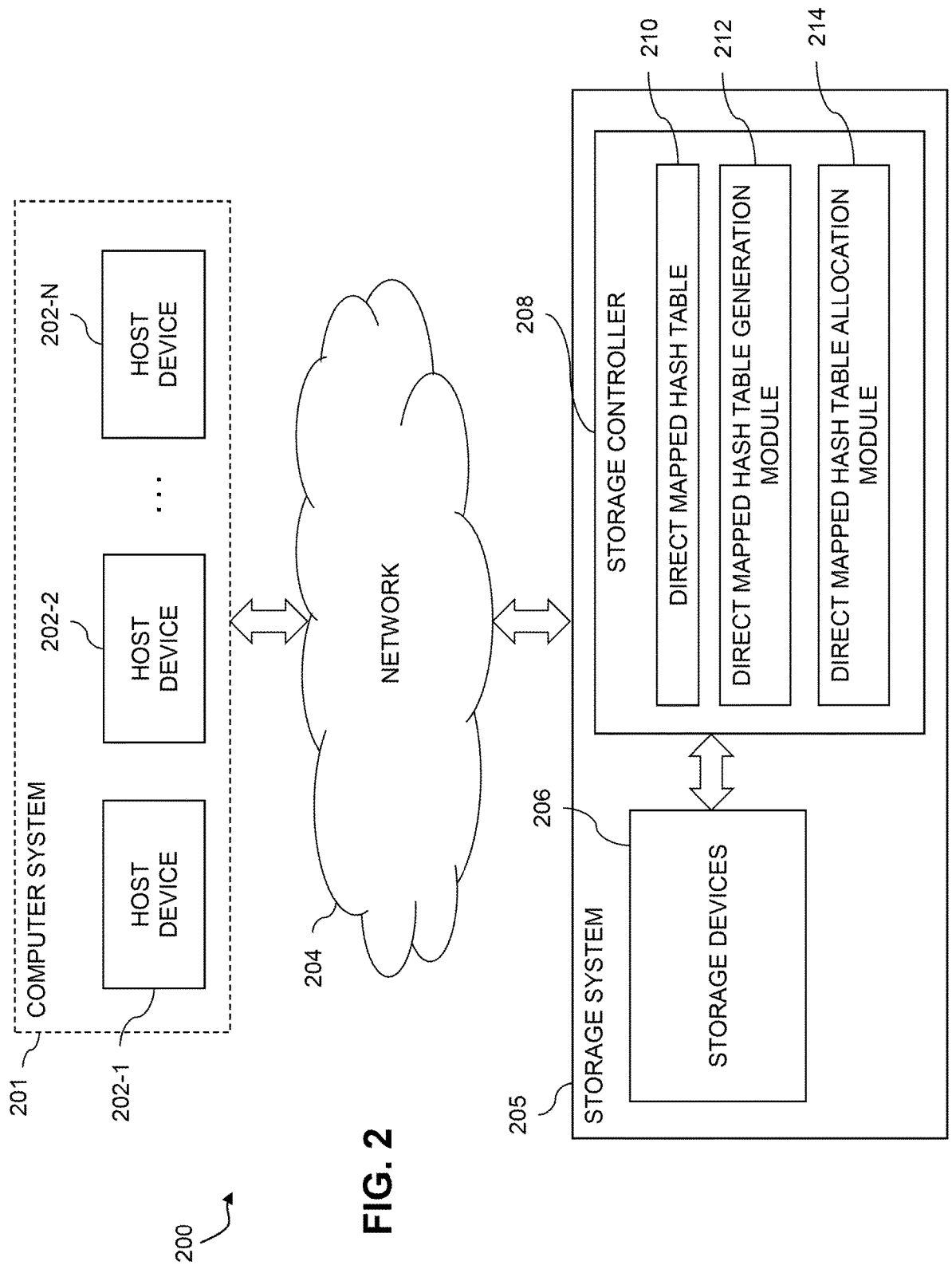
FIG. 2 is a block diagram of an information processing system comprising a storage system configured with functionality for generating a direct mapped hash table and allocating values in the direct mapped hash table in an illustrative embodiment.

FIG. 2 shows an information processing system 200 configured in accordance with another illustrative embodiment. The information processing system 200 comprises a computer system 201 that includes host devices 202-1, 202-2, . . . 202-N. The host devices 202 communicate over a network 204 with a storage system 205. The computer system 201 is assumed to comprise an enterprise computer system, cloud-based computer system or other arrangement of multiple compute nodes associated with respective users. The host devices 202 of the computer system 201 in some embodiments illustratively provide compute services such as execution of one or more applications on behalf of each of one or more users associated with respective ones of the host devices 202.

Similar to the storage systems 105 of system 100, the storage system 205 comprises storage devices 206, storage controller 208 and direct mapped hash tables 210. However, in this embodiment, the direct mapped hash table generation and allocation functionality is implemented in the storage system 205, rather than in one of the host devices 202. Accordingly, the storage controller 208 in this embodiment comprises modules 212 and 214, which are configured to operate in substantially the same manner as that described above for respective corresponding modules 112 and 114 of the host device 102 in the system 100.

In some embodiments, functionality for direct mapped hash table generation and allocation functionality can be implemented partially in a host device and partially in a storage system. Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

Figure 3:
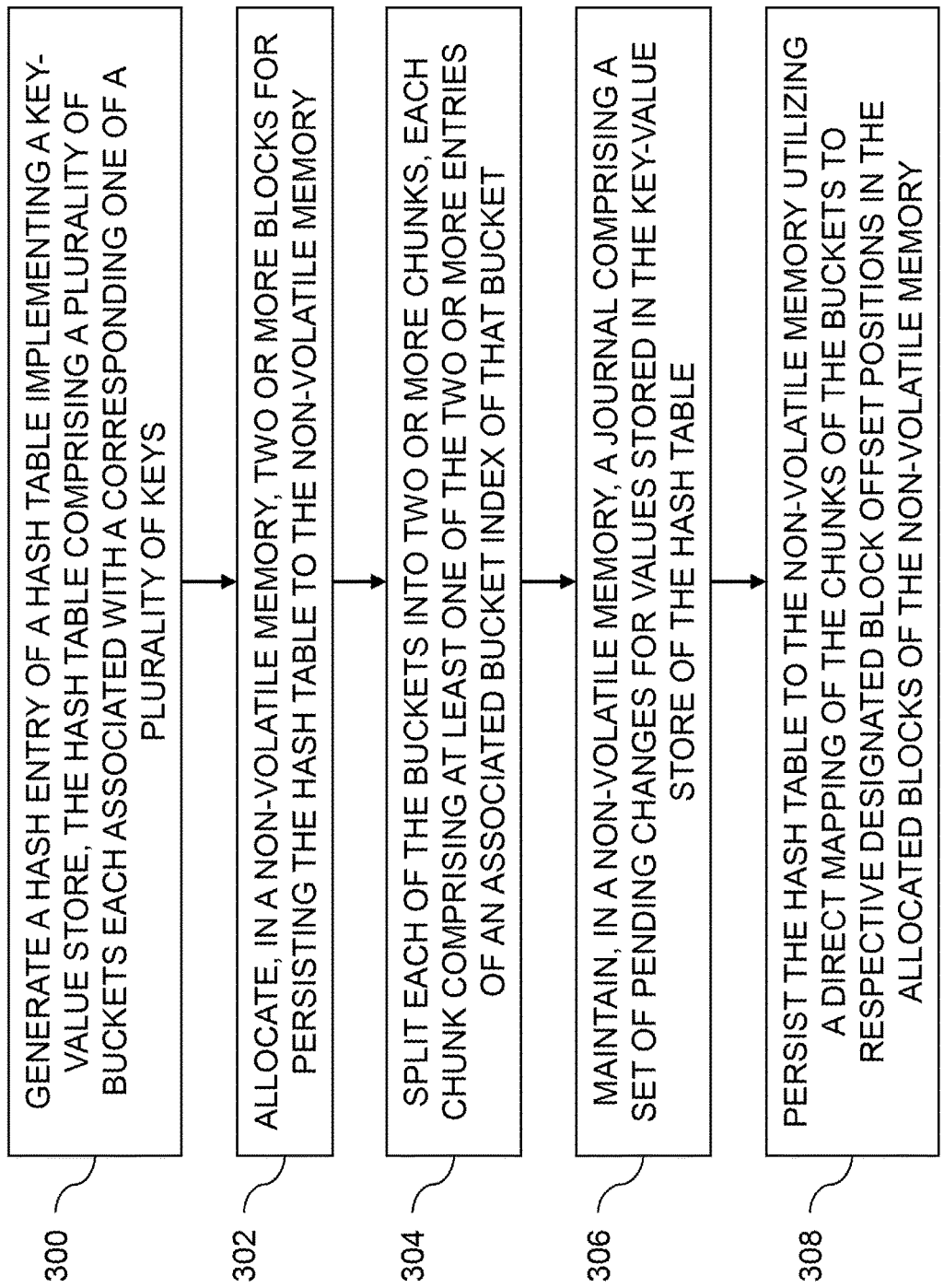
FIG. 3 is a flow diagram of a process for generating a direct mapped hash table in an illustrative embodiment.
Figure 4:
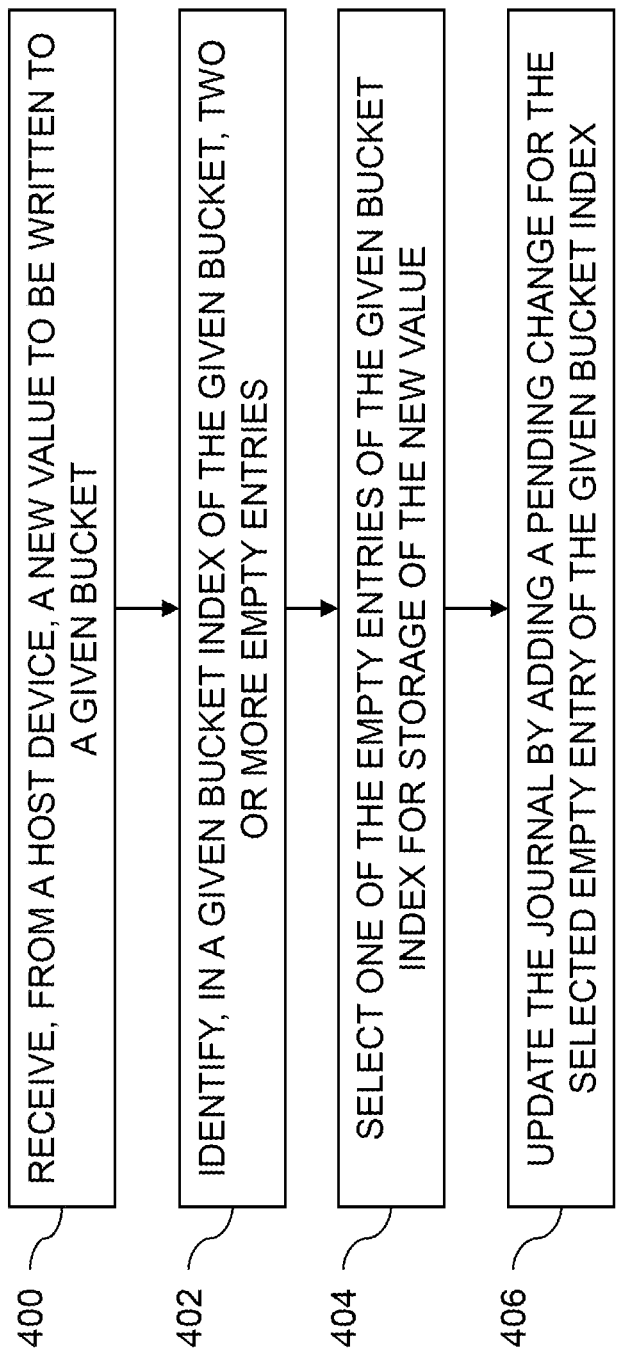
FIG. 4 is a flow diagram of a process for allocating values in a direct mapped hash table in an illustrative embodiment.

The operation of the information processing systems 100 and 200 will now be described in further detail with reference to the flow diagrams of the illustrative embodiments of FIGS. 3 and 4. FIG. 3 illustrates a process for generating a direct mapped hash table, and includes steps 300 through 308. FIG. 4 illustrates a process for allocating values in a direct mapped hash table, and includes steps 400 through 406. The processes of FIGS. 3 and 4 are suitable for use in systems 100 and 200 but are more generally applicable to other types of information processing systems in which a host device or storage system is configured to generate and allocate values in a direct mapped hash table. The steps are illustratively performed at least in part under the control of the direct mapped hash table generation module 112 and/or direct mapped hash table allocation module 114 in host device 102 of system 100 or in modules 212 and/or 214 in storage controller 208 of system 200.

The FIG. 3 process begins with step 300, generating a hash entry of a hash table that implements a key-value store. The hash table is of dynamic size and is direct mapped to non-volatile memory. The non-volatile memory in some embodiments is assumed to utilize block-based data storage. The hash table includes a plurality of buckets, with each bucket being associated with a corresponding one of a plurality of keys. Each bucket has an associated bucket index that comprises entries for storage of values that hash to a particular key associated with that bucket. It should be appreciated that the choice of hash function used for the hash table may vary as desired, such as to adjust for key sizes and increase or decrease the associated chances of hash collision.

Two or more blocks in a non-volatile memory are allocated in step 302 for persisting the hash table to the non-volatile memory. Step 302 illustratively involves allocating enough blocks in the non-volatile memory for a worst-case storage scenario in which buckets reach their maximal length (e.g., when all entries of a bucket have values written thereto). Each of the allocated blocks includes designated positions for storage of chunks from at least two different buckets. In some embodiments, each block has a designated amount of storage space that is sufficient for storing chunks from only a subset of the number of buckets in the hash table (e.g., the number of positions in each allocated block is less than the total number of buckets).

In step 304, each of the buckets is split into multiple chunks, with each chunk comprising at least one of the entries of an associated bucket index of that bucket. In some embodiments, this includes splitting each bucket into two or more-equally sized chunks each containing a fixed number of consecutive entries of the associated bucket index for that bucket. The hash table generated in step 300 may include a specified maximum bucket length and a split size, and each bucket may be split into a number of chunks that is determined as a function of the maximum bucket length and the split size.

A journal comprising a set of pending changes for values stored in the key-value store of the hash table is maintained in step 306 in non-volatile memory. The hash table is persisted to the non-volatile memory in step 308 utilizing a direct mapping of the chunks of the buckets to respective designated block offset positions in the allocated blocks of the non-volatile memory. Step 308 involves, for example, storing a first one of the two or more chunks of a given bucket in a first one of the allocated blocks and storing at least a second one of the two or more chunks of the given bucket in at least a second one of the allocated blocks. In this manner, the blocks may be filled in proportion to the actual chunks in use.

In some embodiments, persisting the hash table to the non-volatile memory in step 308 is performed in response to one or more designated conditions of the journal maintained in step 306. Such designated conditions may include the journal being full, determining that the journal comprises a designated threshold number of pending changes for one or more of the allocated blocks, etc. In some embodiments, it is desired to reduce a number of writes to the non-volatile memory, as such writes may be considered "expensive" in terms of the time or other resources required to complete the write operations. Thus, it may be desired to aggregate multiple pending changes in a single write operation to the non-volatile memory. For example, the designated condition may be waiting to update a particular block or group of blocks until there is some threshold number of changes pending for an allocated block or blocks (e.g., aggregating changes to a single write operation). The designated condition may also be in response to expiration of some designated time period, in response to a user request, etc.

Once constructed, values may be written to various entries in the respective bucket indexes of the direct mapped hash table. It is generally desired to begin filling each bucket starting with its first entry, and continuing as necessary to fill additional entries so as to reduce the number of allocated block in the non-volatile memory that are actually in use. Over time, however, multiple values may be written to and deleted from the key-value store, leading to a choice of empty entries or "holes" that may be filled when a new value is received that is to be stored in the direct mapped hash table. FIG. 4 illustrates a process for intelligently allocating values in the direct mapped hash table to optimize amortization.

The FIG. 4 process begins with step 400, receiving from a host device a new value that is to be written to a given bucket. The given bucket is determined by hashing the given value to obtain a given key associated with the given bucket. In step 402, empty entries in a given bucket index of the given bucket are identified. When there are multiple empty entries, there is thus an option of which entry to select for writing the new value received in step 400. In step 404, one of the empty entries of the given bucket index is selected for storage of the new value, and in step 406 the journal is updated by adding a pending change for the selected empty entry of the given bucket index.

Empty entries may refer to entries having values that were previously deleted (e.g., invalid entries as described above), or entries for which values have not previously been written. In either case, improvements in amortization may be provided by smart selection of the empty entry to which the new value is stored. For the former case where empty entries correspond to entries whose values were previously deleted, such empty entries may map to different allocated blocks in the non-volatile memory. To optimize amortization, it may be desired to select a particular empty entry based on the number of pending changes for each of those different allocated blocks. In some embodiments, this includes determining, for each of the empty entries in the given bucket index, an associated one of the allocated blocks to which that entry in the given bucket index maps in the non-volatile memory, identifying a number of pending changes for each of the associated allocated blocks, and selecting the empty entry based at least in part on the identified numbers of pending changes for each of the associated allocated blocks (e.g., selecting the associated allocated block with a highest number of pending changes).

It should be noted that empty entries may also correspond to entries in the given bucket index for which no value has been previously written. Although it is generally desired to fill entries of a bucket index consecutively (e.g., so as to reduce the total number of allocated blocks in use), there may be various scenarios where it is desired to skip entries to optimize amortization. Consider, as an example, a scenario wherein bucket A has no values written thereto in its first or second chunks, but where multiple other buckets (e.g., buckets B and C) have values written thereto in entries in both their first and second chunks which are stored in the same allocated blocks of the non-volatile memory. Further consider that the journal includes a number of pending changes in an allocated block of the non-volatile memory that stores the second chunks of buckets B and C but no or fewer pending changes in an allocated block of the non-volatile memory that stores the first chunks of buckets B and C. If a request is received to write a value to bucket A, it may be desired to write that value to an entry in the second chunk for bucket A so that it may be aggregated with the pending changes for buckets B and C, even though the first chunk of bucket A is empty and could be written to.

The particular processing operations and other system functionality described in conjunction with the flow diagrams of FIGS. 3 and 4 are presented by way of illustrative example only, and should not be construed as limiting the scope of the disclosure in any way. Alternative embodiments can use other types of processing operations for generation of and allocation in direct mapped hash tables. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different direct mapped hash table generation and allocation processes for respective different direct mapped hash tables or for different storage systems or portions thereof within a given information processing system.

Functionality such as that described in conjunction with the flow diagram of FIGS. 3 and 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 208 that is configured to control performance of one or more steps of the FIG. 3 process in its corresponding system 100 or 200 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host device 102 of system 100 or the storage controller 208 of system 200, as well as other system components, may be implemented at least in part using processing devices of such processing platforms. For example, in a distributed implementation of the storage controller 208, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate direct mapped hash table generation and allocation techniques as disclosed herein.

An illustrative embodiment of such a content addressable storage system will now be described with reference to FIG. 5. In this embodiment, a content addressable storage system 505 comprises a plurality of storage devices 506 and an associated storage controller 508. The content addressable storage system 505 may be viewed as a particular implementation of the storage system 205, and accordingly is assumed to be coupled to host devices 202 of computer system 201 via network 204 within information processing system 200.

The storage controller 508 in the present embodiment is configured to implement direct mapped hash table generation and allocation functionality of the type previously described in conjunction with FIGS. 1 through 4.

The storage controller 508 includes a direct mapped hash table 510 and distributed modules 512 and 514, which are configured to operate in a manner similar to that described above for respective corresponding modules 112, 212 and 114, 214.

Figure 5:
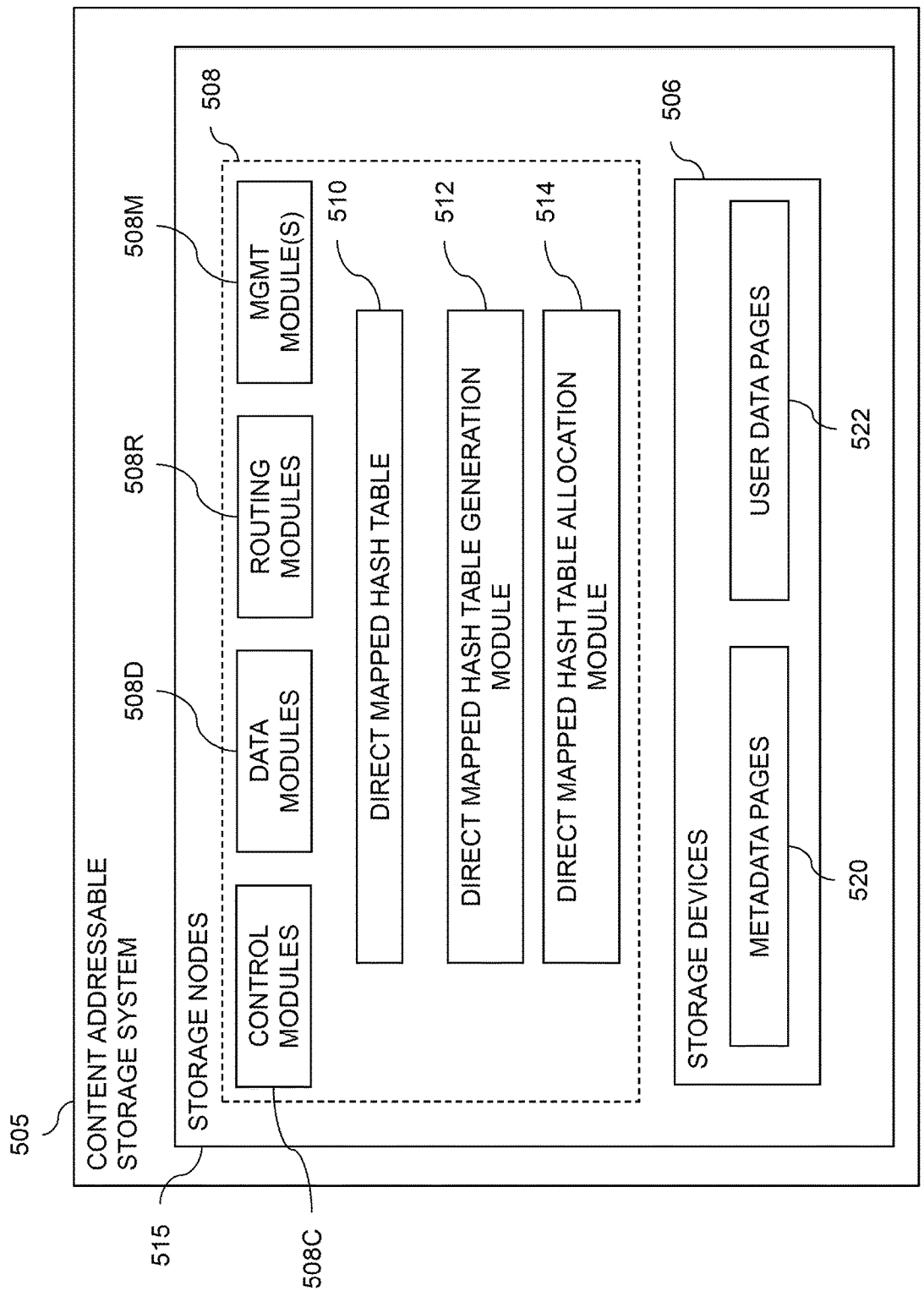
FIG. 5 shows a content addressable storage system having a distributed storage controller configured with functionality for generating a direct mapped hash table and allocating values in the direct mapped hash table in an illustrative embodiment.

The content addressable storage system 505 in the FIG. 5 embodiment is implemented as at least a portion of a clustered storage system and includes a plurality of storage nodes 515 each comprising a corresponding subset of the storage devices 506. Other clustered storage system arrangements comprising multiple storage nodes can be used in other embodiments. A given clustered storage system may include not only storage nodes 515 but also additional storage nodes coupled to network 204. Alternatively, such additional storage nodes may be part of another clustered storage system of the system 200. Each of the storage nodes 515 of the storage system 505 is assumed to be implemented using at least one processing device comprising a processor coupled to a memory.

The storage controller 508 of the content addressable storage system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 may be more particularly referred to as a distributed storage controller.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the content addressable storage system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515.

Each of the storage nodes 515 of the storage system 505 therefore comprises a set of processing modules configured to communicate over one or more networks with corresponding sets of processing modules on other ones of the storage nodes. A given such set of processing modules implemented on a particular storage node illustratively includes at least one control module 508C, at least one data module 508D and at least one routing module 508R, and possibly a management module 508M. These sets of processing modules of the storage nodes collectively comprise at least a portion of the distributed storage controller 508.

Communication links may be established between the various processing modules of the distributed storage controller 508 using well-known communication protocols such as IP and Transmission Control Protocol (TCP). For example, respective sets of IP links used in data transfer and corresponding messaging could be associated with respective different ones of the routing modules 508R.

Although shown as separate modules of the distributed storage controller 508, the modules 512 and 514 in the present embodiment are assumed to be distributed at least in part over at least a subset of the other modules 508C, 508D, 508R and 508M of the storage controller 508. Accordingly, at least portions of the direct mapped hash table generation and allocation functionality of the modules 512 and 514 may be implemented in one or more of the other modules of the storage controller 508. In other embodiments, the modules 512 and 514 may be implemented as stand-alone modules of the storage controller 508.

The storage devices 506 are configured to store metadata pages 520 and user data pages 522, and may also store additional information not explicitly shown such as checkpoints and write journals. The metadata pages 520 and the user data pages 522 are illustratively stored in respective designated metadata and user data areas of the storage devices 506. Accordingly, metadata pages 520 and user data pages 522 may be viewed as corresponding to respective designated metadata and user data areas of the storage devices 506.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 520 and the user data pages 522.

The user data pages 522 are part of a plurality of LUNs configured to store files, blocks, objects or other arrangements of data, each also generally referred to herein as a "data item," on behalf of users associated with host devices 202. Each such LUN may comprise particular ones of the above-noted pages of the user data area. The user data stored in the user data pages 522 can include any type of user data that may be utilized in the system 200. The term "user data" herein is therefore also intended to be broadly construed.

The content addressable storage system 505 in the embodiment of FIG. 4 is configured to generate hash metadata providing a mapping between content-based digests of respective ones of the user data pages 522 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 522. The hash metadata generated by the content addressable storage system 505 is illustratively stored as metadata pages 520 in the metadata area. The generation and storage of the hash metadata is assumed to be performed under the control of the storage controller 508.

Each of the metadata pages 520 characterizes a plurality of the user data pages 522. For example, a given set of user data pages representing a portion of the user data pages 522 illustratively comprises a plurality of user data pages denoted User Data Page 1, User Data Page 2, . . . User Data Page n.

Each of the user data pages 522 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 506.

Each of the metadata pages 520 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 520 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 505 is illustratively distributed among the control modules 508C.

The direct mapped hash table generation and allocation functionality provided by modules 512 and 514 in this embodiment is assumed to be distributed across multiple distributed processing modules, including at least a subset of the processing modules 508C, 508D, 508R and 508M of the distributed storage controller 508.

For example, the management module 508M of the storage controller 508 may include direct mapped hash table generation and allocation logic that engages corresponding logic instances in all of the control modules 508C and routing modules 508R in order to implement direct mapped hash table generation and allocation processes.

In some embodiments, the content addressable storage system 505 comprises an XtremIO™ storage array suitably modified to incorporate techniques for direct mapped hash table generation and allocation functionality as disclosed herein.

In arrangements of this type, the control modules 508C, data modules 508D and routing modules 508R of the distributed storage controller 508 illustratively comprise respective C-modules, D-modules and R-modules of the XtremIO™ storage array. The one or more management modules 508M of the distributed storage controller 508 in such arrangements illustratively comprise a system-wide management module ("SYM module") of the XtremIO™ storage array, although other types and arrangements of system-wide management modules can be used in other embodiments. Accordingly, direct mapped hash table generation and allocation functionality in some embodiments is implemented under the control of at least one system-wide management module of the distributed storage controller 508, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 508C such that control of the slices within the storage controller 508 of the storage system 505 is substantially evenly distributed over the control modules 508C of the storage controller 508.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 505 each illustratively comprise one or more IO operations directing that at least one data item of the storage system 505 be written to in a particular manner. A given write request is illustratively received in the storage system 505 from a host device, illustratively one of the host devices 202. In some embodiments, a write request is received in the distributed storage controller 508 of the storage system 505, and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 515 communicate with one another over a high-speed internal network such as an InfiniBand network. The C-modules, D-modules and R-modules coordinate with one another to accomplish various IO processing tasks.

The write requests from the host devices identify particular data pages to be written in the storage system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 505 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 505.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 506. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 505 correspond to respective physical blocks of a physical layer of the storage system 505. The user data pages of the logical layer are organized by LBA and have reference via respective content-based signatures to particular physical blocks of the physical layer.

Each of the physical blocks has an associated reference count that is maintained within the storage system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 4 embodiment is presented by way of example only. Numerous alternative arrangements of processing modules of a distributed storage controller may be used to implement direct mapped hash table generation and allocation functionality in a clustered storage system in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of host devices or storage systems with direct mapped hash table generation and allocation functionality as disclosed herein can provide a number of significant advantages relative to conventional arrangements.

For example, some embodiments provide techniques for increasing space efficiency in direct mapped hash tables, while also optimizing amortization thus reducing a number of writes to persistent storage.

Functionality for direct mapped hash table generation and allocation functionality can be implemented in a host device, in a storage system, or partially in a host device and partially in a storage system.

These and other embodiments can considerably reduce the amounts of computational and memory resources that are required to generate direct mapped hash tables and allocate values therein, thus providing associated improvements in system performance.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for generating direct mapped hash tables and allocating values in direct mapped hash tables will now be described in greater detail with reference to FIGS. 6 and 7. Although described in the context of system 100, these platforms may also be used to implement at least portions of other information processing systems in other embodiments.

Figure 6:
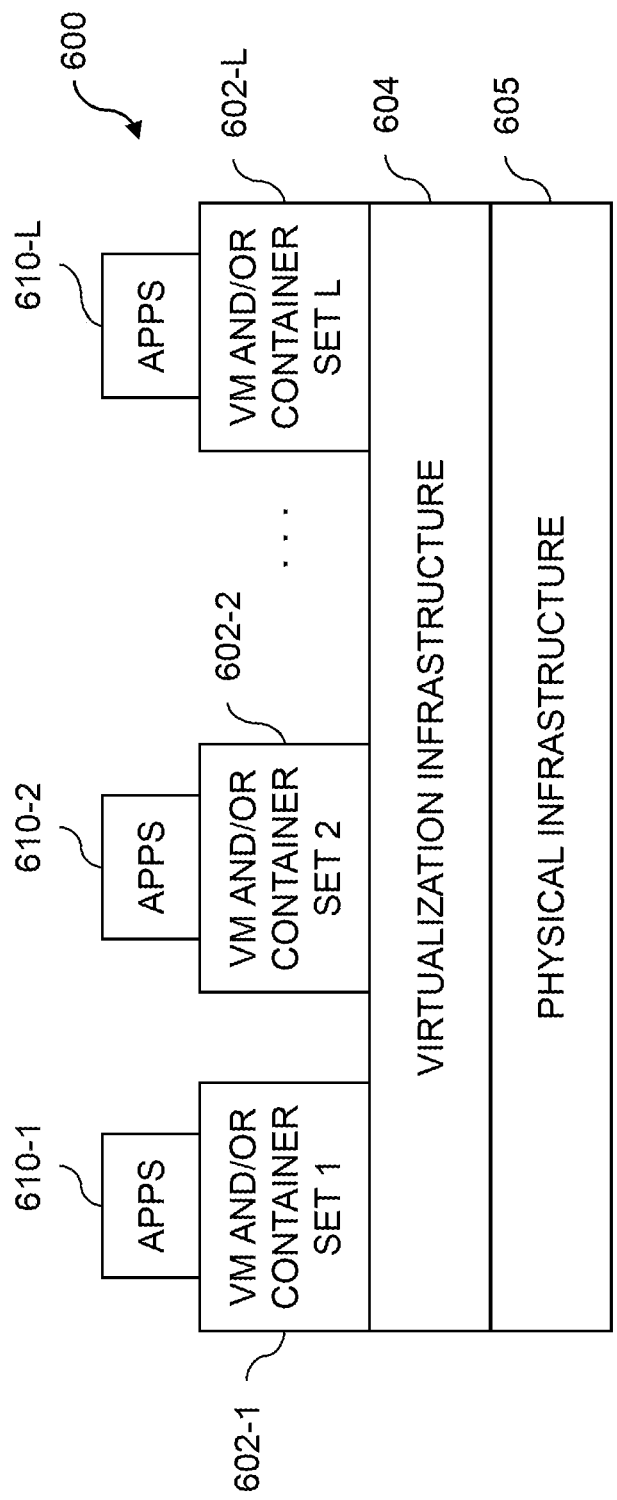
FIGS. 6 and 7 show examples of processing platforms that may be utilized to implement at least a portion of an information processing system in illustrative embodiments.
Figure 7:
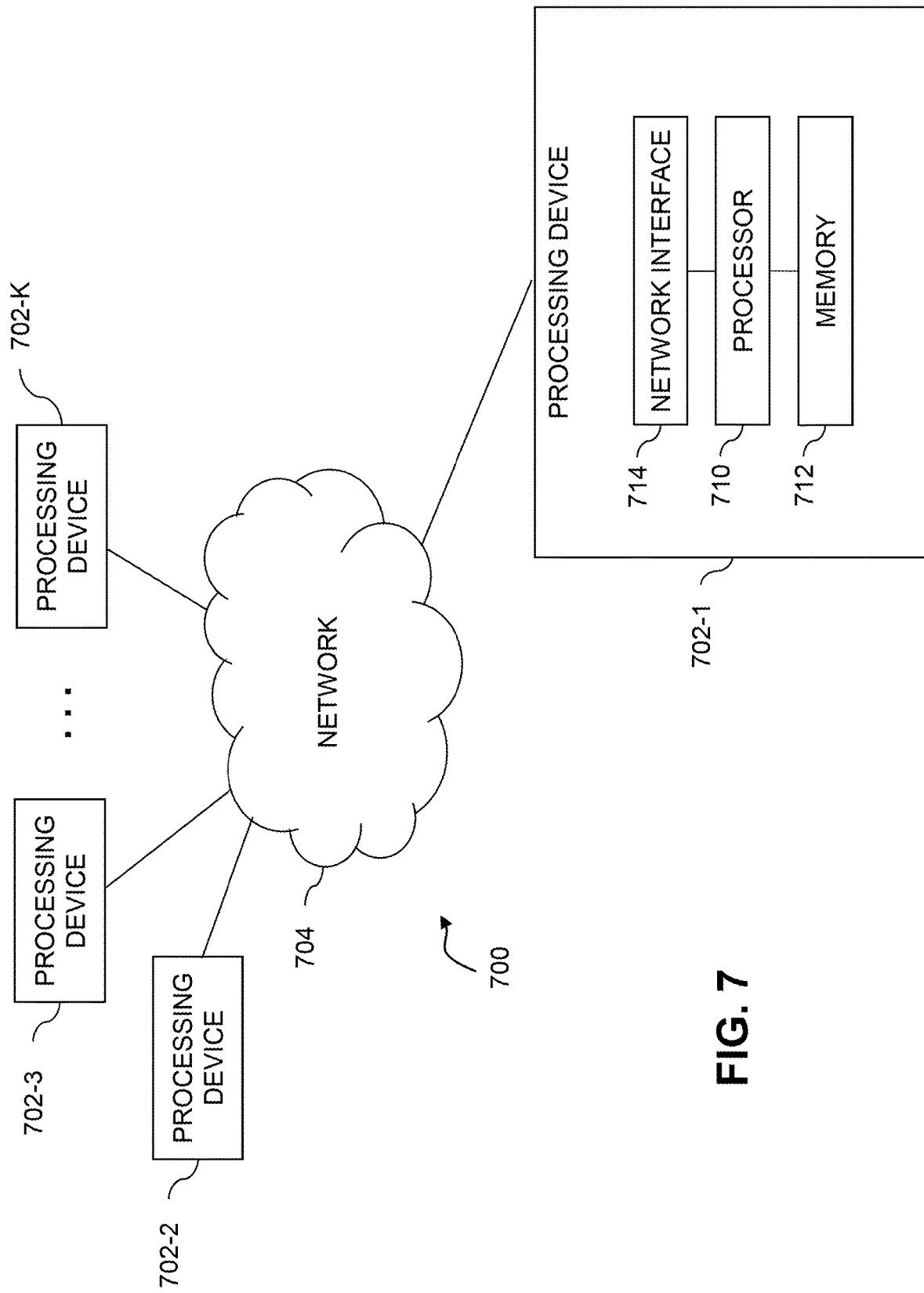

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide direct mapped hash table generation and allocation functionality of the type described above for one or more processes running on a given one of the VMs. For example, each of the VMs can implement direct mapped hash table generation and allocation functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide direct mapped hash table generation and allocation functionality of the type described above for one or more processes running on different ones of the containers. For example, a container host device supporting multiple containers of one or more container sets can implement one or more instances of direct mapped hash table generation and allocation logic for use in generating direct mapped hash tables and allocating values therein.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the direct mapped hash table generation and allocation functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, direct mapped hash tables and associated logic for generation thereof and allocation of values therein. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a hardware processor;
   the processing device being configured:
      to generate a hash entry of a hash table implementing a key-value store, the hash table comprising a plurality of buckets each associated with a corresponding one of a plurality of keys, a given bucket comprising a given bucket index having two or more entries for storage of values that hash to a given key associated with the given bucket;
      to allocate, in a non-volatile memory, two or more blocks for persisting the hash table to the non-volatile memory;
      to split the given bucket into two or more chunks, each chunk comprising at least one of the two or more entries of the given bucket index; and
      to persist the hash table to the non-volatile memory utilizing a direct mapping of the two or more chunks of the given bucket to respective designated positions in the allocated blocks of the non-volatile memory;
   wherein persisting the hash table to the non-volatile memory comprises storing a first one of the two or more chunks of the given bucket in a first one of the allocated blocks and storing at least a second one of the two or more chunks of the given bucket in at least a second one of the allocated blocks.

2. The apparatus of claim 1 wherein splitting the given bucket into two or more chunks comprises splitting the given bucket into two or more-equally sized chunks each containing a fixed number of consecutive entries of the bucket index.

3. The apparatus of claim 1 wherein generating the hash entry of the hash table comprises specifying a maximum bucket length and a split size, and wherein the given bucket is split into a number of chunks determined as a function of the maximum bucket length and the split size.

4. The apparatus of claim 1 wherein each of the allocated blocks comprises designated positions for storage of chunks from at least two different ones of the plurality of buckets.

5. The apparatus of claim 1 wherein a given one of the allocated blocks comprises a designated amount of storage space sufficient for storing a first number of chunks, the first number of chunks being less than a number of buckets in the hash table.

6. The apparatus of claim 1 wherein the processing device is further configured to maintain, in a non-volatile memory, a journal comprising a set of pending changes for values stored in the key-value store of the hash table, and wherein persisting the hash table to the non-volatile memory is performed responsive to a designated condition of the journal.

7. The apparatus of claim 6 wherein the designated condition comprises determining that the journal is full.

8. The apparatus of claim 6 wherein the designated condition comprises determining that the journal comprises a designated threshold number of pending changes for a given one of the allocated blocks.

9. The apparatus of claim 6 wherein persisting the hash table to the non-volatile memory comprises aggregating at least two of the set of pending changes in a single write operation to the non-volatile memory.

10. The apparatus of claim 6 wherein the processing device is further configured:
to receive, from a host device, a new value to be written to the given bucket;
to identify, in the given bucket index, two or more empty entries;
to select one of the empty entries of the given bucket index for storage of the new value; and
to update the journal by adding a pending change for the selected empty entry of the given bucket index.

11. The apparatus of claim 10 wherein at least one of the empty entries in the given bucket index comprises an entry whose value was previously deleted.

12. The apparatus of claim 10 wherein at least one of the empty entries in the given bucket index comprises an entry for which a value has not previously been written.

13. The apparatus of claim 10 wherein selecting one of the empty entries for the given bucket index comprises:
determining, for each of the empty entries in the given bucket index, an associated one of the allocated blocks to which that entry in the given bucket index maps in the non-volatile memory;
identifying a number of pending changes for each of the associated allocated blocks; and
selecting the empty entry based at least in part on the identified numbers of pending changes for each of the associated allocated blocks.

14. The apparatus of claim 13 wherein selecting the empty entry based at least in part on the identified numbers of pending changes for each of the associated allocated blocks comprises selecting the associated allocated block with a highest number of pending changes.

15. A method comprising:
generating a hash entry of a hash table implementing a key-value store, the hash table comprising a plurality of buckets each associated with a corresponding one of a plurality of keys, a given bucket comprising a given bucket index having two or more entries for storage of values that hash to a given key associated with the given bucket;
allocating, in a non-volatile memory, two or more blocks for persisting the hash table to the non-volatile memory;
splitting the given bucket into two or more chunks, each chunk comprising at least one of the two or more entries of the given bucket index; and
persisting the hash table to the non-volatile memory utilizing a direct mapping of the two or more chunks of the given bucket to respective designated block offset positions in the allocated blocks of the non-volatile memory;
wherein persisting the hash table to the non-volatile memory comprises storing a first one of the two or more chunks of the given bucket in a first one of the allocated blocks and storing at least a second one of the two or more chunks of the given bucket in at least a second one of the allocated blocks; and
wherein the method is implemented by at least one processing device comprising a hardware processor.

16. The method of claim 15 further comprising maintaining, in a non-volatile memory, a journal comprising a set of pending changes for values stored in the key-value store of the hash table, wherein persisting the hash table to the non-volatile memory is performed responsive to a designated condition of the journal.

17. The method of claim 16 further comprising:
receiving, from a host device, a new value to be written to the given bucket;
identifying, in the given bucket index, two or more empty entries;
selecting one of the empty entries of the given bucket index for storage of the new value; by:
determining, for each of the empty entries in the given bucket index, an associated one of the allocated blocks to which that entry in the given bucket index maps in the non-volatile memory;
identifying a number of pending changes for each of the associated allocated blocks; and
selecting the empty entry based at least in part on the identified numbers of pending changes for each of the associated allocated blocks; and
updating the journal by adding a pending change for the selected empty entry of the given bucket index.

18. A computer program product comprising a non-transitory processor-readable storage medium having stored therein program code of one or more software programs, wherein the program code when executed by at least one processing device causes said at least one processing device:
to generate a hash entry of a hash table implementing a key-value store, the hash table comprising a plurality of buckets each associated with a corresponding one of a plurality of keys, a given bucket comprising a given bucket index having two or more entries for storage of values that hash to a given key associated with the given bucket;
to allocate, in a non-volatile memory, two or more blocks for persisting the hash table to the non-volatile memory;

to split the given bucket into two or more chunks, each chunk comprising at least one of the two or more entries of the given bucket index; and to persist the hash table to the non-volatile memory utilizing a direct mapping of the two or more chunks of the given bucket to respective designated positions in the allocated blocks of the non-volatile memory;

wherein persisting the hash table to the non-volatile memory comprises storing a first one of the two or more chunks of the given bucket in a first one of the allocated blocks and storing at least a second one of the two or more chunks of the given bucket in at least a second one of the allocated blocks.

19. The computer program product of claim 18 wherein the program code when executed by said at least one processing device further causes said at least one processing device to maintain, in a volatile memory, a journal comprising a set of pending changes for values stored in the key-value store of the hash table, and wherein persisting the hash table to the non-volatile memory is performed responsive to a designated condition of the journal.

20. The computer program product of claim 19 wherein the program code when executed by said at least one processing device further causes said at least one processing device:

to receive, from a host device, a new value to be written to the given bucket;

to identify, in the given bucket index, two or more empty entries;

to select one of the empty entries of the given bucket index for storage of the new value; by:
  determining, for each of the empty entries in the given bucket index, an associated one of the allocated blocks to which that entry in the given bucket index maps in the non-volatile memory;
  identifying a number of pending changes for each of the associated allocated blocks; and
  selecting the empty entry based at least in part on the identified numbers of pending changes for each of the associated allocated blocks; and to update the journal by adding a pending change for the selected empty entry of the given bucket index.

\* \* \* \* \*